United States Patent [19]

Kar

[11] Patent Number: 4,781,770

[45] Date of Patent: Nov. 1, 1988

[54] PROCESS FOR LASER HARDFACING DRILL BIT CONES HAVING HARD CUTTER INSERTS

[75] Inventor: Naresh J. Kar, Westminster, Calif.

[73] Assignee: Smith International, Inc., Newport Beach, Calif.

[21] Appl. No.: 83,404

[22] Filed: Aug. 10, 1987

Related U.S. Application Data

[63] Continuation-in-part of Ser. No. 843,048, Mar. 24, 1986, Pat. No. 4,708,752.

[30] Foreign Application Priority Data

Mar. 12, 1987 [IE] Ireland .................................. 646/87
Mar. 13, 1987 [EP] European Pat. Off. ........ 87 3021794
Mar. 18, 1987 [MX] Mexico ..................................... 5613
Mar. 23, 1987 [JP] Japan .................................. 62-65897

[51] Int. Cl.⁴ ............................................. C21D 9/22
[52] U.S. Cl. ................................... 148/16.5; 148/152; 148/903; 148/905

[58] Field of Search .................. 148/127, 152, 4, 26.5, 148/903, 905, 910; 227/9; 219/121 L, 121 LM

[56] References Cited

U.S. PATENT DOCUMENTS 3,158,214 11/1964 Wisler et al. ......................... 148/127
3,989,554 11/1976 Wisler .................................. 148/127
4,015,100 3/1977 Gnanamuthu et al. ................. 148/4
4,303,137 12/1981 Fischer ................................. 148/905

Primary Examiner—L. Dewayne Rutledge
Assistant Examiner—S. Kastler
Attorney, Agent, or Firm—Robert G. Upton

[57] ABSTRACT

A cone blank for a rotary cone rock bit is forged, rough machined, carburized and heat-treated, followed by the formation of insert holes therein. Inserts are then pressed into the insert holes. The finished cone is subsequently sprayed with hardfacing cladding material in powdered form. The powder is thereafter densified and fused with a laser source to give a hard, erosion-resistant clad layer on the outer surface, including in the immediate vicinity of the inserts.

14 Claims, 1 Drawing Sheet

PROCESS FOR LASER HARDFACING DRILL BIT CONES HAVING HARD CUTTER INSERTS

CROSS-REFERENCE TO RELATED APPLICATION

This application is a continuation-in-part of Ser. No. 843,048, U.S. Pat. No. 4,708,752, filed Mar. 24, 1986, entitled "Process for Laser Hardening Drilling Bit Cones Having Hard Cutter Inserts".

BACKGROUND OF THE INVENTION

1. Field of the Invention

The present invention is directed to a process of manufacturing cones of drilling bits which have hard cutter inserts. More particularly, the present invention is directed to a process of laser hardfacing the outer shell surfaces of roller cone bits of the type which have hard tungsten carbide or like cutter inserts.

2. Brief Description of the Prior Art

One important type of rotary drill bit used for subterranean drilling includes cutter cones which have hard tungsten carbide or like cutter inserts. Usually such cutter cones are rotatably mounted on journal legs of the drill bit so as to rotate as the drill bit is rotated. The drill bit may be rotated from the surface, or by a "downhole" motor. The tungsten carbide or like hard cutter inserts of cutter cones are pressed into insert holes formed in the external surface of the cutter cones. These tungsten carbide inserts bear against the rock formation at the bottom of the hole, crushing and chipping the rock as drilling proceeds.

Because rock drilling is a technically very demanding service, and because failure of a drilling bit can cause very costly interruption in the drilling process, the construction of rock bits must be very rugged. Usually the cones of the drilling bit are made of forged alloy steel, although powder metallurgy and related cones have also been described in patent and technical literature. Bearing surfaces are located within the interior of the cones to enable rotatable mounting to the journal leg. An effective seal must be provided between the rotating cone and the journal leg so as to prevent escape of lubricating grease from the bearings and to prevent entry of drilling fluid and other foreign matter in the bearing.

The steel body of the cone itself must be sufficiently ductile and tough so as to avoid fracture or shattering. Certain parts of the interior of the cone, particularly the ball bearing races, must be quite hard in order to provide sufficiently long bearing life. The exterior of the cutter cone ideally should also be quite hard and abrasion resistant so as to avoid rapid wear due to its exposure to the formation and the highly abrasive and erosive action of the drilling fluid.

The tungsten carbide or other hard inserts in the roller cones must be held sufficiently strongly so as to prevent premature loss. The inserts must also be prevented from rotating in the insert holes because rotation in the insert hole leads to decreased drilling efficiency and eventually to loss of the insert.

In view of the economic importance of subterranean drilling for oil and other minerals, the prior art has developed a variety of technological approaches to more or less satisfy the above-summarized requirements.

In accordance with one basic approach, the forged steel cone body is made of a "carburizable" low carbon steel which has sufficient ductility and toughness to be adequately resistant to fracture. Certain parts of the interior of the cone, such as the bearing races, may be carburized to increase their hardness. The exterior of the cone however does not have a hardened case. A hardened exterior case would prevent insert holes from being easily drilled and is therefore not practical because of manufacturing limitations.

In light of the manufacturing difficulty of drilling holes through a hard case, most roller cones have an exterior shell surface which is not carburized and have a surface hardness of only approximately 40 Rockwell C (Rc) hardness units. Whereas the alloy steel of these cones is adequately ductile and tough, lack of external shell surface hardness and abrasion resistance results in relatively rapid wear and erosion of the cone shell during drilling, often resulting in loss of tungsten carbide inserts and inadequate bit performance.

One approach to increasing the hardness of the cone shell steel around inserts is covered by U.S. Pat. No. 4,708,752, assigned to the same assignee as the present invention, cited here for cross-reference. In this application, a medium to high carbon steel body of a roller cone bit is machined to final dimensions and then etched black with a paint or phosphate etch. Holes are drilled for inserts in the body and then the inserts are press fitted into the body. The inserts themselves are shiny and reflective whereas the black etched (or painted) body is rendered absorbent to laser light. The body is subjected to laser treatment using, for example, a carbon-dioxide laser which raises the surface of the blackened steel body to above austenitizing temperature. Rapid self-quenching results in a hard martensitic layer forming on the external surface with a hardness of 57 to 60 Rockwell C units. This hard layer is present in the steel even in the immediate vicinity of the inserts. The inserts themselves have shiny heat reflective surfaces and therefore do not absorb laser light and are consequently not affected.

Because of the variety of rock formations being drilled and the variation in loads/speeds to which the bit is subjected, methods other than hardening of steel need to be investigated to minimize erosion and abrasive wear. Hardfacing of steel by manual oxyacetylene methods has been a traditional approach applied on different downhole tools to reduce steel wear. A number of patents have issued related to hardfacing steel components and hardfacing mixtures, all used to reduce wear and erosion. However, these methods and teachings cannot be applied toward hardfacing the cone shell of rock bits around the inserts, as will be discussed.

U.S. Pat. No. 3,989,554, for example, teaches the use of a composite hardfacing of air hardening steel and particles of tungsten carbide, used to increase the wear resistance of manufactured articles such as tool joints. The outer surfaces of bit legs for shirttails have been hardfaced with atomic hydrogen torches, as taught in U.S. Pat. No. 3,158,214. However, all of these methods employ heat sources that cause some extent of melting and dilution of the substrate to which these are applied. Consequently, if attempts were made to hardface a finished cone with inserts, melting of the substrate would destroy the dimensional aspects of the cone and also damage the interference fit between inserts-insert holes that essentially retain inserts in the cone-shell during drilling Limitations in manufacturing also make it impossible to first conventionally hardface the exterior of a cone and then attempt to drill through this hard coating to press inserts into the cone.

As is apparent from the foregoing, there is still a substantial need in the prior art for a process for substantially hardfacing, in an economically feasible manner, the exterior shell surface of hard insert bearing roller cones in the immediate vicinity of inserts. The present invention provides such a process.

SUMMARY OF THE INVENTION

It is an object of the present invention to provide an economical process for hardfacing the exterior shell surface of hard insert bearing cones for drilling bits.

It is another object of the present invention to provide an economical process for hardfacing the exterior shell surface of hard insert bearing cones for drilling bits in a manner which does not substantially interfere with the sequence of operations for placing the hard inserts into the cone.

It is an important object of the present invention to provide a hardfacing method to produce high adherence of a wear-resistant coating or cladding on the surface of a rock bit cutter cone (or any downhole tool), also including the immediate vicinity of any external cutter inserts or the like that have been press fitted or brazed or metallurgically bonded into the body of the downhole tool.

It is a further object of this invention to provide a high wear-resistant coating/cladding that has high density-low porosity surface layers, with a minimum of interdiffusion between the external coating and the substrate layers.

It is a further object of this invention to provide a method for putting down this cladding by a means that does not destroy the external cutter inserts.

It is a further object of this invention to provide a method for putting down this cladding by a means that does not destroy insert cutter hole geometry or press fit of the insert cutter or the braze material that may be used to secure the insert within the insert hole.

It is a further object of this invention to obviate the need for posttreatment of the cone or downhole tool. The hardfacing is carried out on a cone/tool that is in a completely finished configuration.

In accordance with this invention, a cone blank, for example, is forged, rough machined, carburized and heat-treated by conventional means. Inserts are pressed onto the cone shell and the inner bearings are finish machined, as is conventionally practiced.

The finished cones are then sprayed with cladding material in the form of powder. The powder may be a mixture of carbides in a matrix, which may be blended with an organic mixture, such as cellulose acetate, to facilitate adhesion to the substrate during spraying. Alternatively, a high velocity plasma spray may be used to spray the powder. The powder is then densified and fused with a laser source. The powder may also be directly introduced into the laser beam and onto the cone surface substrate, using a gravity or fluidized bed type powder feeder.

In accordance with this invention, a continuous wave laser beam is scanned along the powder material adhering to the surface of the cone to melt it. The rate of scanning is such that resolidification of the cladding on the cone surface occurs very quickly. The shiny light reflective inserts remain unaffected by the laser beam since they do not absorb adequate laser energy. A finished cone with inserts is thus given a hard cladding on the shell in the vicinity of the inserts.

The above noted objects and advantages of the present invention will be more fully understood upon a study of the following description in conjunction with the detailed drawings.

Figure 1:
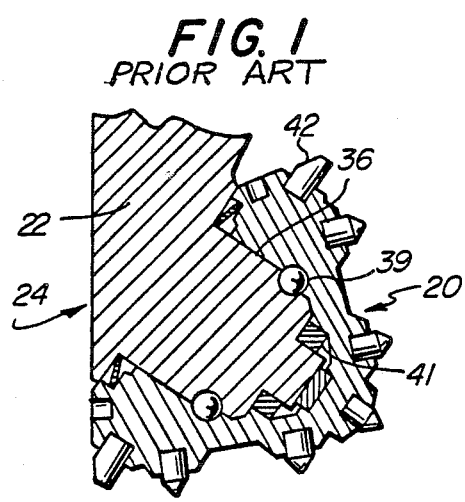
FIG. 1 is a cross-sectional view of a prior art roller cone of a rock bit mounted on a journal leg.

DESCRIPTION OF THE PREFERRED EMBODIMENTS AND BEST MODE FOR CARRYING OUT THE INVENTION

The following specification taken in conjunction with the drawings sets forth the preferred embodiments of the present invention. The embodiments of the invention disclosed herein are the best mode contemplated by the inventor for carrying out his invention in a commercial environment, although it should be understood that several modifications can be accomplished within the scope of the present invention.

Referring now to the drawing figures, the process of the invention for the manufacture of a roller cone of a rock drilling bit is illustrated. Nevertheless, it should be understood that the process of the present invention may be used for the manufacture of other types of drilling bits, and other tools as well, and is therefore not specifically limited to roller cones.

Figure 2:
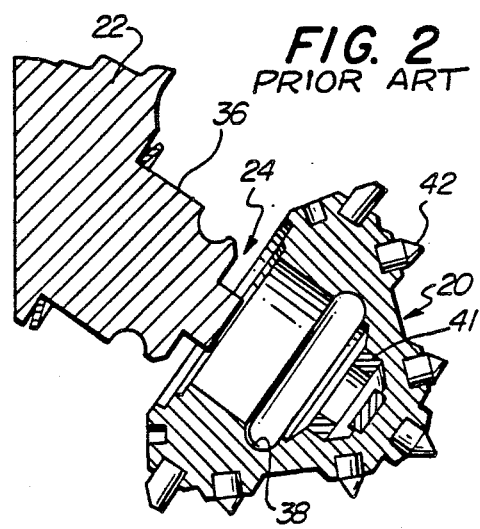
FIG. 2 is an exploded cross-sectional view of the prior art roller cone and journal leg shown in FIG. 1.

FIGS. 1 and 2 illustrate prior art roller cones, generally designated as 20, mounted to journal leg 22 of a rock drilling bit, generally designated as 24 (the whole of which is not shown). As it will become apparent from the ensuing description in connection with FIGS. 3 through 6, in the herein-described preferred embodiments the process of the invention is applied to a roller cone 20 of substantially conventional overall configuration. Therefore, the mechanical features and configuration of the roller cone 20 and of the associated journal leg 22 are not described here in detail. Rather, for a detailed description of these conventional features, reference is made to U.S. Pat. Nos. 4,303,137 and 3,680,873, the specifications of which are hereby expressly incorporated by reference.

Although there is a similarity in overall appearance between the prior art roller cone 20 illustrated in FIGS.

Figure 3:
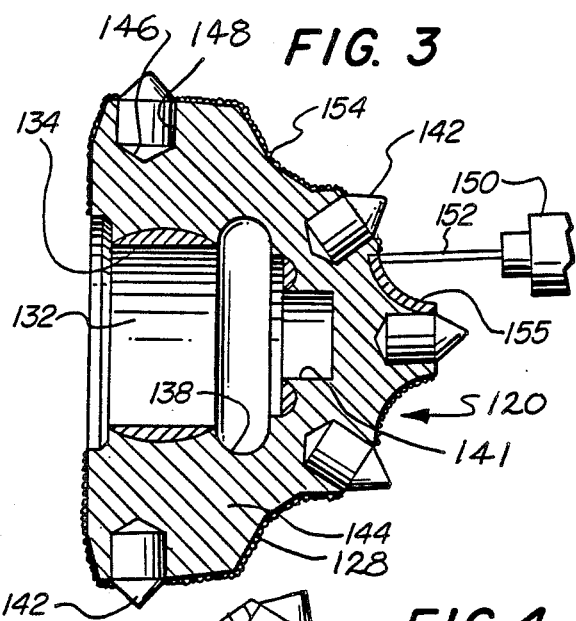
FIG. 3 is a cross-sectional view of a finished roller cone, schematically showing a step in the process of the present invention where the exterior shell of the cone is bombarded by laser light and powder has been preplaced on the surface of the cone.
Figure 6:
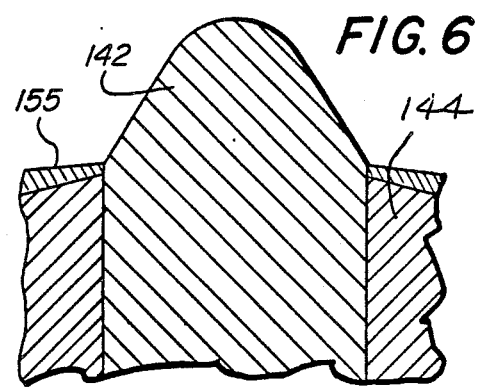
FIG. 6 is a schematic drawing representing a cross section micrograph of an actual roller cone prepared in accordance with the process of the present invention, the micrograph representing an approximately six-fold magnification.

1 and 2 and the roller cone 120 of FIG. 3, cone 120 of FIG. 3 is made in accordance with the present invention in the novel process of having a hard cladding cone shell case on its exterior surface 128 and in certain other portions of its surface. The hard cladding material on the exterior case 128 and the other surfaces is very beneficial for the durability and reliability of operation of the drilling bit.

Thus, in accordance with the present invention, a forged steel body of the roller cone 120 is machined to substantially close final dimensions. The forged steel body includes an interior cavity 132 having a bearing race 134 lined, in accordance with practice in the art, with a "soft" bearing material of, for example, aluminum bronze alloy. The bearing race 134 contacts a complementary journal race cantilevered from a leg of the rock bit (FIG. 1). The interior cavity 132 also includes a ball race 138 for the balls which retain the roller cone 120 on the journal leg. The cone retention balls 39 are shown with reference again to FIG. 1. The ball race 138 may be hardened by a laser hardening process described in U.S. Pat. No. 4,303,137. The spindle bore 141 may also be similarly hardened. Alternatively, the surfaces may be carburized as taught in the prior art.

A plurality of insert retention holes 146 are drilled in the exterior shell 128. Drilling of insert holes 146, per se, is known in the art. More particularly, the insert holes are usually drilled to be approximately 0.003 inch smaller in diameter than the hard cutter inserts 142, which are to be press fitted into the holes 146. Typically, a force of approximately 500 pounds may be required to press the cutter inserts 142 into place in the insert holes 146. A problem which has been substantially unsolved in the prior art in connection with the insert holes 146 is that drilling of the holes 146 through a hardened, carburized (or hardfaced) exterior shell is difficult. On the other hand, walls 148 of the insert holes 146 must not be carburized or otherwise hardened. This is because hardening of the walls 148 of the insert holes 146 makes placement of the inserts 142 into the holes 146 very difficult and creates a danger of cracking the steel body 144 of the cone 120. Inserts are pressed into these holes and the inner bore is completely finish machined.

Figure 4:
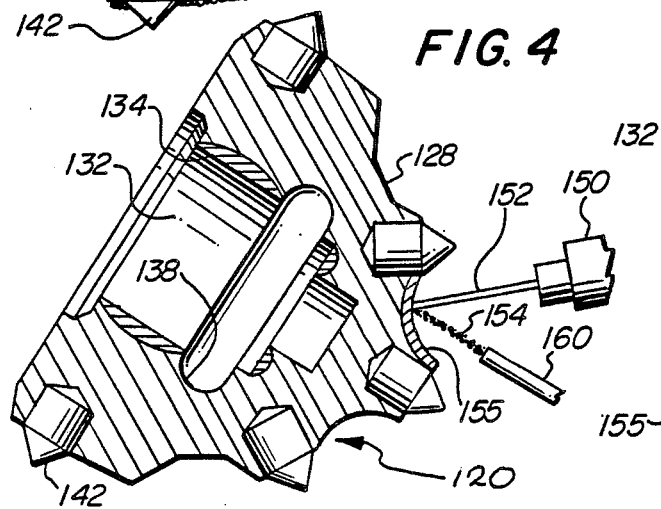
FIG. 4 is a cross-sectional view of the roller cone blank, schematically showing a step in the process of the present invention where the exterior shell of the cone is bombarded by laser light while powder is fed into the beam and onto the substrate.
Figure 5:
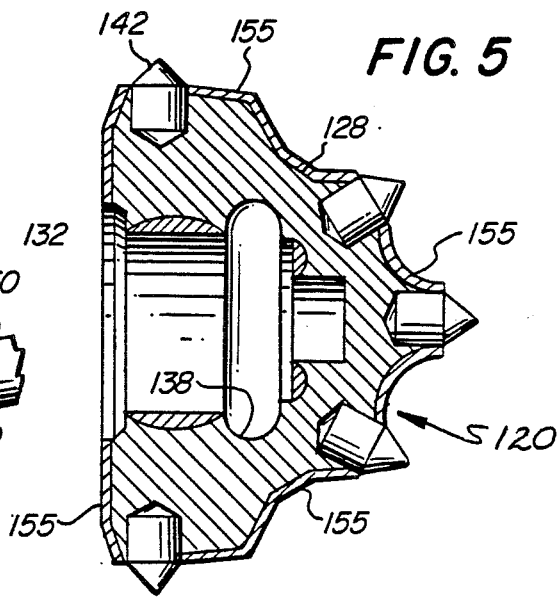
FIG. 5 is a cross-sectional view showing the roller cone blank after the step of bombarding with laser light has been completed on the cone shell surfaces and the shell has a hard cladding.

With reference now to FIGS. 3 through 5, the finished cone 120 is preferably sprayed with cladding material 154 in the form of powder through a nozzle 160 (FIG. 4). The powder may be a mixture of carbides in a matrix, which may be blended with an organic mixture, such as cellulose acetate, to facilitate adhesion to the cone surface substrate 128 during spraying. Alternatively, a high velocity plasma spray may be used to spray the powder 154 earlier, as shown in FIG. 3. The powder spray unit is not shown. The powder is then densified and fused with a laser source 150. The powder 154 may also be directly introduced into the laser beam 152 and onto the cone surface substrate 128, using a gravity or fluidized bed type powder feeder (not shown). Moreover, as the laser beam 152 is removed from contact with the localized area, the area is very rapidly cooled by sinking its heat into the surrounding large, cool steel body 144. As a result, "scanning" with the laser beam 152 serves as a very effective means for creating a hard layer 155 in the exterior shell 128.

The laser beam 152, used in the process of the present invention, must be powerful enough for the herein-described application; a continuous wave carbon dioxide laser of at least approximately 1500 watt power output is suitable. In the herein-described preferred embodiment of the process of the present invention, a carbon dioxide laser generator, Model 975 of Spectra Physics Company, San Jose, Calif., is used. The laser beam 152 used in this preferred process has 5000 watt power and a beam diameter of approximately 0.4 inch.

The entire exterior shell 128 of the intermediate steel body 144 is treated with the laser beam 152 in a raster pattern by using a mechanical scanner (not shown). Alternatively, an optical integrating mirror arrangement (not shown) can also be used to cover the surface of the exterior shell 128 with the laser beam 152. The purpose of the scanner or optical integrator would be to widen the coverage of the laser beam.

Referring now particularly to FIGS. 4 and 5, a principal novel feature of the present invention lies in the fact that the treatment with the laser beam 152 of the exterior shell 128 need not be selective to exclude the inserts. The inserts themselves are shiny and reflective and therefore do not absorb adequate laser energy. Consequently the inserts and their press fit in the cone are unaffected. Nonselective processing over inserts thus renders the step of laser treating the exterior 128 of the cone 120 economically feasible.

It will be readily appreciated by those skilled in the art that the intensity of the laser beam 152 and the duration of its impact on the intermediate steel body 144 of the roller cone 120 may be adjusted to obtain a layer 155 of virtually any desired practical thickness, also dependent on the powder feed rate. Preferably, the layer 155 is between approximately 0.015 to 0.03 inch thick; most preferred is a layer 155 of approximately 0.02 inch thickness. A layer 15 of approximately 0.02 inch is considered to be adequate in connection with the process of the present invention when it is applied to roller cones. The hardness of the surface layer 155, achieved in accordance with the present invention, is approximately 57 to 60 Rockwell C (Rc) units using Stellite 1 powder laser clad onto an AISI 9313 substrate. This layer is present even around inserts. This is in contrast to the 38 to 40 Rc hardness around inserts present in conventional cone steels.

In this invention, the hard cutter inserts are inserted into the holes 146 in a conventional manner. The hard cutter inserts 142 preferably comprise tungsten carbide, although the present invention is not limited by the nature of the inserts 142.

The roller cone 120, when subjected to laser treatment in the manner described above is such that the laser beam 152 does not sufficiently raise the temperature of the inserts 142 to cause damage because the inserts are shiny and reflective to laser light. The laser beam 152 is also out of focus with respect to the inserts 142 and this also contributes to the lack of effectiveness of the laser beam 152 on the inserts 142. Alternatively, if the inserts are coated and dull (for example, with a diamond coating), that is, lacking reflective luster, these may be protected by a copper cap or other reflective material placed on each of the inserts (not shown).

Significant advantages of the roller cones 120 prepared by the process of the present invention include the greatly increased hardness and dramatically improved abrasion and erosion resistance of the exterior shell. This, of course, results in dramatically less "wash out" of the cone shell, and prolonged life. Also, the finished cone has inserts 142 surrounded by a high yield strength layer 155 on the cone body 144, as indicated on FIG. 6. This retards any tendency for inserts to rock or rotate during drilling. Still further, laser treatment does not affect the dimensions of the roller cone or insert press fit so that no post treatment is required after the laser treatment. In light of the foregoing factors, the overall cost of laser treatment and of the roller cones attained thereby is low.

Typical hardfaced coatings 155 that can be clad are cited here for example. These would include Stellite 1, containing carbide particles of high hardness Rockwell C (HRC 70) embedded in a cobalt matrix of hardness HRC 45. The laser cladding would have a composite hardness of HRC 60. Other hardfaced coatings that could be used would include Stellite Alloy No. 6 with a resultant hardness of 48 HRC. In the nickel-based alloys, typical alloys, such as Colmonoy No. 72, could be fed in situ as powder or presprayed onto the cone. Densification on laser cladding would give a deposit of 62 HRC hardness. Other Colmonoy Alloys, for example, Colmonoy No. 750 with 50% tungsten carbide particles, could also be laser clad in a similar fashion.

Alloys containing nickel, chromium and silicon, for example, "DURAFACE" (Borg-Warner), can also be successfully clad to give hardness of 65 HRC.

These materials are cited here for example and should not be interpreted to limit the scope of this invention.

The process of laser cladding can also be extended to other surfaces of the rock bit, for example, shirttails of bits. Other downhole tools, for example, percussion and drag bits, can be clad with external hard coatings similarly, with the cutter inserts being unaffected by their reflectivity (if present) or through an external copper cap or other reflective material placed on each cutter.

It would also be obvious to apply the present hardfacing technique to the earlier filed application now U.S. Pat. No. 4,708,782 assigned to the same assignee as the present invention and incorporated herein by reference. Accordingly, the cones could be processed as follows: a cone blank would be heat treated and machined to final dimensions on the outer cone profile. They would then be blackened using a typical manganese phosphate etch. Insert holes would then be drilled in the cone profile and the inserts pressed into the insert holes. The inner bore would then be laser heat-treated on the ballrace, inner bore and seal gland areas, as previously disclosed. The bore would then be finish machined (not shown). The exterior of the cone would then be sprayed and laser fused as taught with respect to FIGS. 3 through 6.

Several modifications of the process of the present invention may become readily apparent to those skilled in the art in light of the present disclosure. Therefore, the scope of the present invention should be interpreted solely from the following claims, as the claims are read in light of the disclosure.

What is claimed is:

1. A process for hardfacing a hard cutter insert bearing cone for a rock bit comprising the steps of:
    machining a cone blank surface;
    carburizing the bearing surfaces formed within the cone blank;
    heat-treating the cone blank to temper the cone blank to an exterior cone blank hardness of about 40 Rockwell C hardness units;
    forming holes in said cone blank surface for one or more insert cutters;
    pressing the inserts in the insert holes formed in the cone blank;
    finish machining the inner bore of the cone;
    applying a cladding material to the exterior surface of the finished cone blank;
    bombarding the cladding material to the exterior surface of the cone with a laser beam of sufficient intensity and for a sufficient time so as to melt the cladding material into the surface of the cone blank, light reflective means adjacent an exposed surface of said inserts, the exposed light reflective means ajacent the cutter inserts not being heated substantially in the step of subjecting the cladding material to the laser beam on to the exterior surface of the cone, the cladding material being immediately adjacent to said light reflective means adjacent said inserts; and
    cooling the cladding material sufficiently rapidly to form a hard external layer on said cone blank.

2. The process as set forth in claim 1 wherein said light reflective means adjacent said inserts is the light reflective exposed surface of the inserts.

3. The process as set forth in claim 1 wherein said light reflective means adjacent said exposed surface of said inserts is a light reflective cap placed over said exposed surfaces of each of said one or more inserts during said laser heating process, said cap being removed upon completion of said laser heating process.

4. The process as set forth in claim 1 wheren after the steps of bombarding and cooling, the surface hardness of the external cladded surfaces of the cone is approximately 57 to 60 Rockwell C hardness units.

5. The process as set forth in claim 1 wherein the step of bombarding is conducted wth a $CO_2$ laser beam generator having an output power of at least approximately 1500 watts.

6. The process as set forth in claim 10 wherein the laser beam used in the step of bombarding has a beam diameter of approximately 0.4 inch.

7. The process as set forth in claim 5 further comprising the steps of:
    mixing the cladding material with an organic mixture of cellulose acetate to facilitate adhesion of the cladding material to the surface of the cone blank; and
    spraying said mixture onto said cone blank prior to bombarding said mixture with said laser beam.

8. The process as set forth in claim 7 wherein said cladding material is directly introduced into the beam and onto the external surface of the cone blank with a gravity type powder feeder.

9. The process as set forth in claim 7 wherein said cladding material is directly introduced into the beam and onto the external surface of the cone blank with a fluidized bed type powder feeder.

10. The process as set forth in claim 1 wherein the cone blank is formed from an AISI 9313 steel.

11. The process as set forth in claim 1 wherein said cladding material is selected from the group consisting of cobalt based alloys with tungsten, chromium and carbides and nickel based matrix alloys with silicon-chromium-iron-boron and tungsten carbide.

12. A process for hardfacing a downhole cutter tool having one or more hard cutter inserts extending from a surface of the tool comprising the steps of:
    Machining the outer surface of a downhole tool blank;
    heat-treating the tool blank to temper the blank to an exterior tool blank hardness of about 40 Rockwell C hardness units;

forming insert holes in the surface of said downhole tool for said one or more inserts;

inserting said inserts into said insert holes formed by said downhole tool;

applying a cladding material to the exterior surface of said downhole tool;

bombarding the cladding material to the exterior surface of said downhole tool with a laser beam of sufficient intensity and for a sufficient time so as to melt the cladding material into the surface of the downhole tool, light reflective means adjacent an exposed surface of said one or more inserts, the exposed light reflective means adjacent the cutter inserts not being heated substantially in the step of subjecting the cladding material to the laser beam on the exterior surface of the downhole tool, the cladding material being immediately adjacent to said light reflective inserts; and cooling the cladding material sufficiently rapidly to form a hard external layer on said downhole tool.

13. The process as set forth in claim 1 wherein said light reflective means adjacent said inserts is the light reflective exposed surface of the inserts.

14. The process as set forth in claim 1 wherein said light reflective means adjacent said exposed surfaces of said inserts is a light reflective cap placed over said exposed surfaces of each of said one or more inserts during said laser heating process, said cap being removed upon completion of said laser heating process.

* * * * *